United States Patent [19]

Renz et al.

[11] 4,438,979

[45] Mar. 27, 1984

[54] WHEEL COVER

[75] Inventors: Dieter Renz, Rechberghausen; Bernd Löper, Korb, both of Fed. Rep. of Germany

[73] Assignee: Daimler-Benz Aktiengesellschaft, Stuttgart, Fed. Rep. of Germany

[21] Appl. No.: 174,459

[22] Filed: Aug. 1, 1980

[30] Foreign Application Priority Data

Aug. 1, 1979 [DE] Fed. Rep. of Germany ....... 2931163

[51] Int. Cl.$^3$ .............................................. B60B 7/06
[52] U.S. Cl. ............................. 301/37 PB; 301/37 R; 301/37 P
[58] Field of Search ................ 301/37 R, 37 P, 37 B, 301/37 C, 37 T, 37 CD, 37 TP, 37 PB, 108 R, 301/108 A

[56] References Cited

U.S. PATENT DOCUMENTS

| 1,875,906 | 9/1932 | Zarobsky | 301/108 R |
| 3,012,822 | 12/1961 | Mulhern | 301/37 R |
| 3,619,010 | 11/1971 | Foster | 301/37 P |
| 4,232,907 | 11/1980 | Beisch | 301/37 R |

FOREIGN PATENT DOCUMENTS

| 2750425 | 5/1979 | Fed. Rep. of Germany .... 301/37 R |
| 1015295 | 9/1952 | France ............................. 301/37 R |

Primary Examiner—Charles A. Marmor
Attorney, Agent, or Firm—Craig & Burns

[57] ABSTRACT

A wheel cover which includes a mounting comprising several retaining springs detachably arranged at the wheel cover. Each of the retaining springs has a U-shaped configuration and includes a bent-over section with two legs adjoining the bent-over section and resiliently engaging into a channel-like indentation in a rim of a wheel. Each of the retaining springs are pretensionable to a specific predetermined value.

20 Claims, 8 Drawing Figures

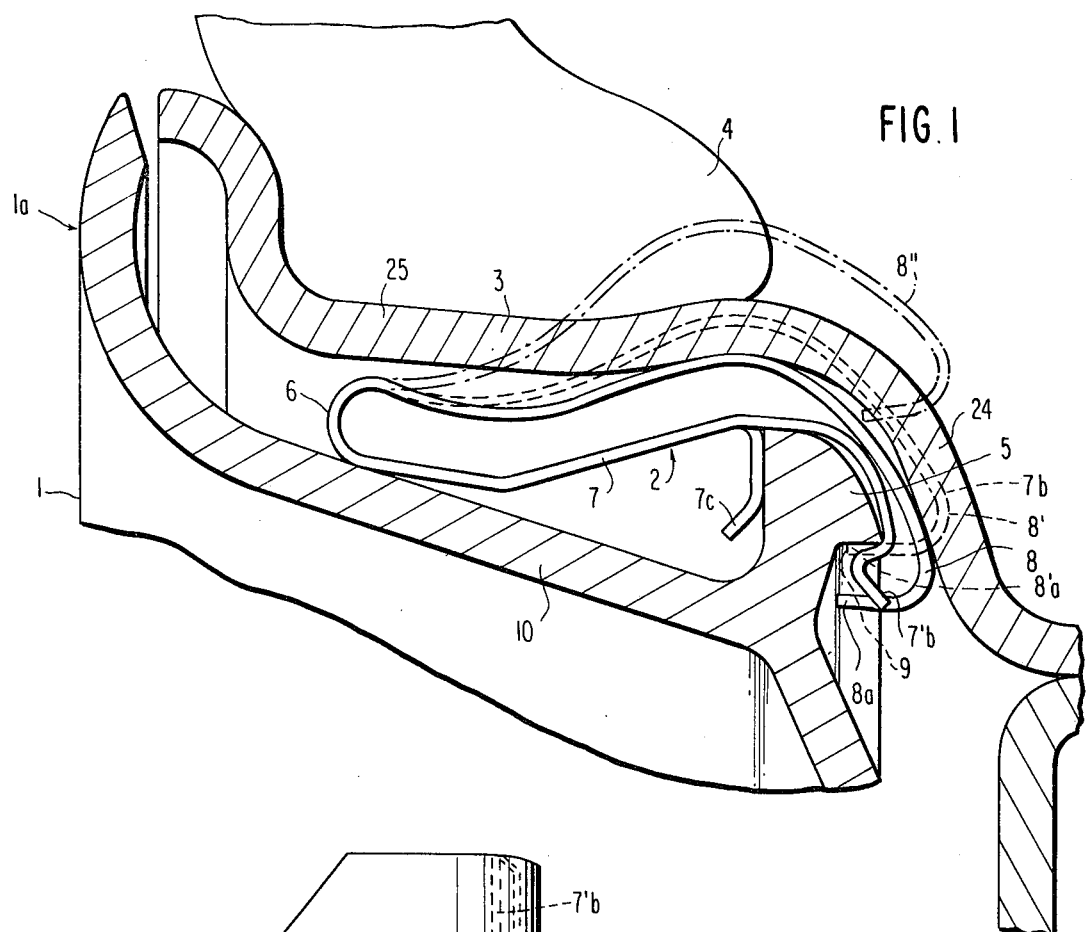
FIG.1
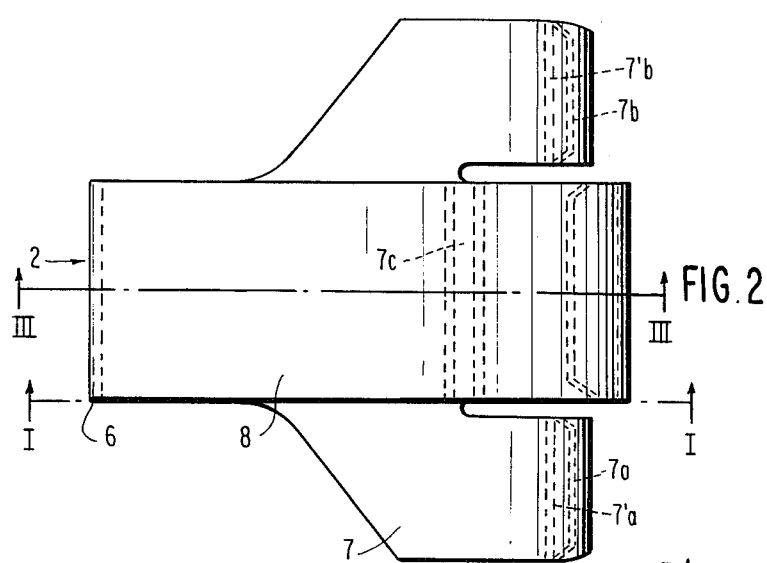
FIG.2
FIG.3b

FIG.5
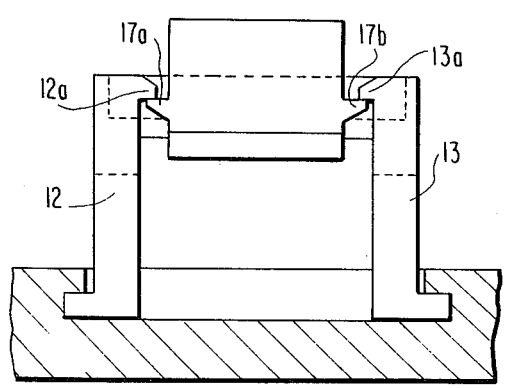
FIG.6
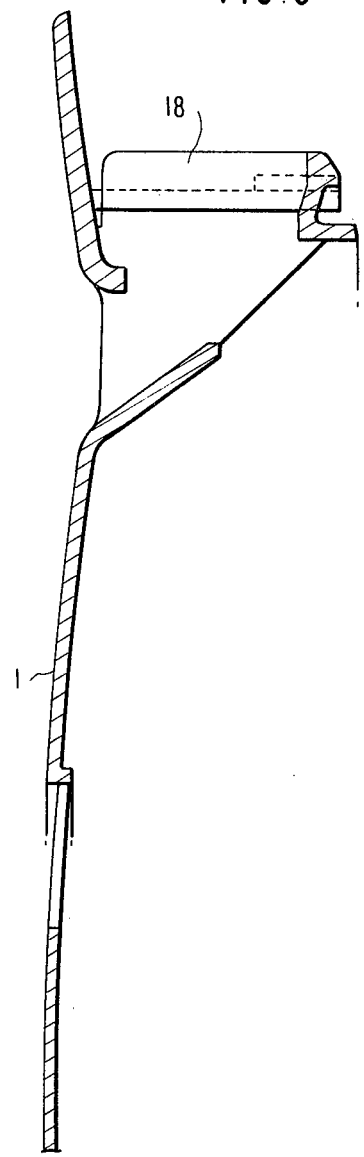
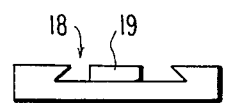
FIG.7

WHEEL COVER

The present invention relates to a wheel cover and, more particularly to a wheel cover for a motor vehicle which includes a mounting consisting of several retaining springs detachably arranged at the wheel cover, which are constructed in principle of U-shaped configuration, which includes each a bent-over section and two legs adjoining the bent-over section and which engage resiliently into a channel-like indentation in a rim of the motor vehicle wheel.

In, for example, German Utility Model No. 1,975,618, a wheel cover of the aforementioned type is disclosed. A disadvantage of such proposed construction resides in the fact that the retaining springs, due to manufacturing tolerances and differing thermal expansion coefficients of the components utilized, must exert great forces with respect to the wheel cover and/or the rim of the wheel if a secure mounting of the wheel cover to the rim is to be ensured in all situations after an assembly of the wheel cover to the wheel. To ensure sufficiently high spring forces, either strong springs must be selected whose spring forces depend greatly on the spring travel or displacement and consequently manufacturing tolerances of the individual parts must lead to different retaining forces, or with the use of wheel covers whose retaining springs have a low spring constant, the prestress path must be selected very large to assure a sufficient retaining force.

The aim underlying the present invention essentially resides in providing a wheel cover for a motor vehicle of the aforementioned type which enables the utilization of retaining springs having a low spring constant but high retaining forces, without having to overcome excessive spring displacements during the installation of the wheel cover onto the rim of the wheel.

The underlying problems are solved according to the present invention in that at least one leg of each retaining spring is movable over a predetermined distance and as a result thereof is adapted to be pretensioned or prestressed. As a result thereof, the required retaining forces and the spring displacements of the retaining springs to be traversed for this purpose do not for the first time have to be produced only as late as during a mounting of the wheel cover in the rim but rather by pretensioning during the mounting of the retaining spring or retaining springs onto the wheel cover. It is thereby advantageous if the bent over section of the retaining spring or springs lie beneath a shoulder of the rim of the wheel while the two legs extend toward the inside of the wheel cover facing the base of the well of the rim.

The retaining springs of the present invention can be pretensioned or prestressed prior to mounting the wheel cover to the rim or to the wheel, whereby only a comparatively small spring displacement remains to be overcome for assembly and/or disassembly and for ensuring the required spring force. Nonetheless, manufacturing tolerances can be readily compensated for because, by reason of the pretensioning and the low spring constant or rate of the retaining springs possible therewith, deivations of the spring displacement traversed in the mounted condition hardly have any influence on the magnitude of the retaining force.

Consequently, with a wheel cover or a decorative wheel cover in accordance with the present invention, it is possible to utilize retaining springs without the occurrence of problems due to tolerances or differing thermal expansion coefficients of the various parts employed. The retaining force exerted by the retaining springs can be readily selected to be so large that a secure mounting of the hub cap or wheel cover to the wheel rim is ensured without requiring the expenditure of great force during assembly and disassembly. Moreover, an almost uniform retaining force is exerted on the rim of the wheel by all of the retaining springs.

In accordance with additional advantageous features of the present invention, an at least partially continuous crown is provided to which the nonmovable leg of the retaining spring may readily be attached.

According to another feature of the present invention, means may be provided for liminting the spring displacement of the movable leg of the retaining spring, which may be constituted by a bent backward end of the movable leg engaging behind the crown.

Additionally, the immovable leg of the retaining springs of the present invention may be provided with bent tabs seated on the crown of the wheel cover while the crown may exhibit an undercut section at an inwardly directed side and the bent tabs of the retaining springs include, at least in part, detent portions at their respective ends.

In accordance with still further features of the present invention, two of the bent tabs of the retaining springs are constructed symmetrically to a center line of the retaining springs and maintain a mutual spacing in which the movable leg finds accommodation. Furthermore, the retaining springs may each be provided in a retaining device and each of the retaining devices may be fixedly attached to the wheel cover by way of a guide means.

Advantageously, the retaining device of the present invention may be provided with a movable holding lug which can be displaced for contact or abutment with the movable leg of the retaining spring. The holding lug may be attached thereby to the retaining device by way of a film-like hinge.

Additionally, in accordance with further features of the present invention, the retaining device may also be provided with two mutually spaced-apart legs having detent cams facing each other and the holding lug may be provided with lateral detent cams engageable with the detent cams of the legs.

The holding lug may be provided with an external surface which extends in a beveled manner and the bent-over section of the retaining springs may have a contact or abutment point on the wheel cover.

In accordance with a further embodiment of the present invention, it is also possible by a suitable choice of the diameter of the retaining ring of the wheel cover to obtain an abutment of the retaining spring at one point of the wheel cover or an abutment of two spring legs against each other at another point so that the spring characteristic increases strongly progressively as soon as the point of the retaining force has been exceeded. As a result thereof, very large disassembly forces are required to remove the wheel cover from the wheels, whereas, the wheel cover in the mounted condition is stressed or acted upon by only comparatively low forces and, in the mounted condition, no forces of such large magnitude act on the wheel cover that a plastic deformation of the wheel cover could take place, even if the wheel cover is made of a synthetic resinous material.

In accordance with the present invention, the wheel cover is fixed in an axial direction of the wheel by the abutment of the point of the retaining spring at the base of the well of the rim while a force component produced by a positive dimension, retainingly acts on the wheel cover in a direction of the base of the well of the rim.

Accordingly, it is an object of the present invention to provide a wheel cover for a motor vehicle which avoids, by simple means, the aforementioned shortcomings and disadvantages encountered in the prior art.

Another object of the present invention is to provide a wheel cover for a motor vehicle which exhibits high retaining forces but does not require excessive spring displacements during a mounting of the wheel cover onto the rim of a wheel.

Yet another object of the present invention resides in providing a wheel cover for a motor vehicle wheel which readily compensates for manufacturing tolerances and takes into account differing coefficients of thermal expansion between the respective parts.

A further object of the present invention resides in providing a wheel cover for a motor vehicle which ensures the application of a uniform retaining force on the rim of the wheel.

A still further object of the present invention resides in providing a wheel cover which minimizes if not avoids a plastic deformation of the wheel cover by the retaining forces exerted thereon.

Another object of the present invention resides in providing a wheel cover for a motor vehicle wheel which is simple in construction and therefore relatively inexpensive to manufacture.

These and other objects, features, and advantages of the present invention will become more apparent from the following description when taken in connection with the accompanying drawings which show, for the purposes of illustration only, several embodiments in accordance with the present invention, and wherein:

FIG. 1 is a partial cross-sectional view through a motor vehicle wheel rim, tire, and wheel cover with a retaining spring in accordance with the present invention taken along the line I—I in FIG. 2;

FIG. 2 is a top view of a retaining spring in accordance with the present invention;

FIG. 3b is a diagramatic illustration of the spring displacement of the movable leg of the retaining springs of the present invention;

FIG. 5 is a front view of the retaining device of FIG. 4;

FIG. 6 is a fragmentary cross-sectional view of a wheel cover illustrating the arrangement of the retaining device of FIGS. 4 and 5; and FIG. 7 is a front view of a modified embodiment of a guide rail.

Figure 3A:
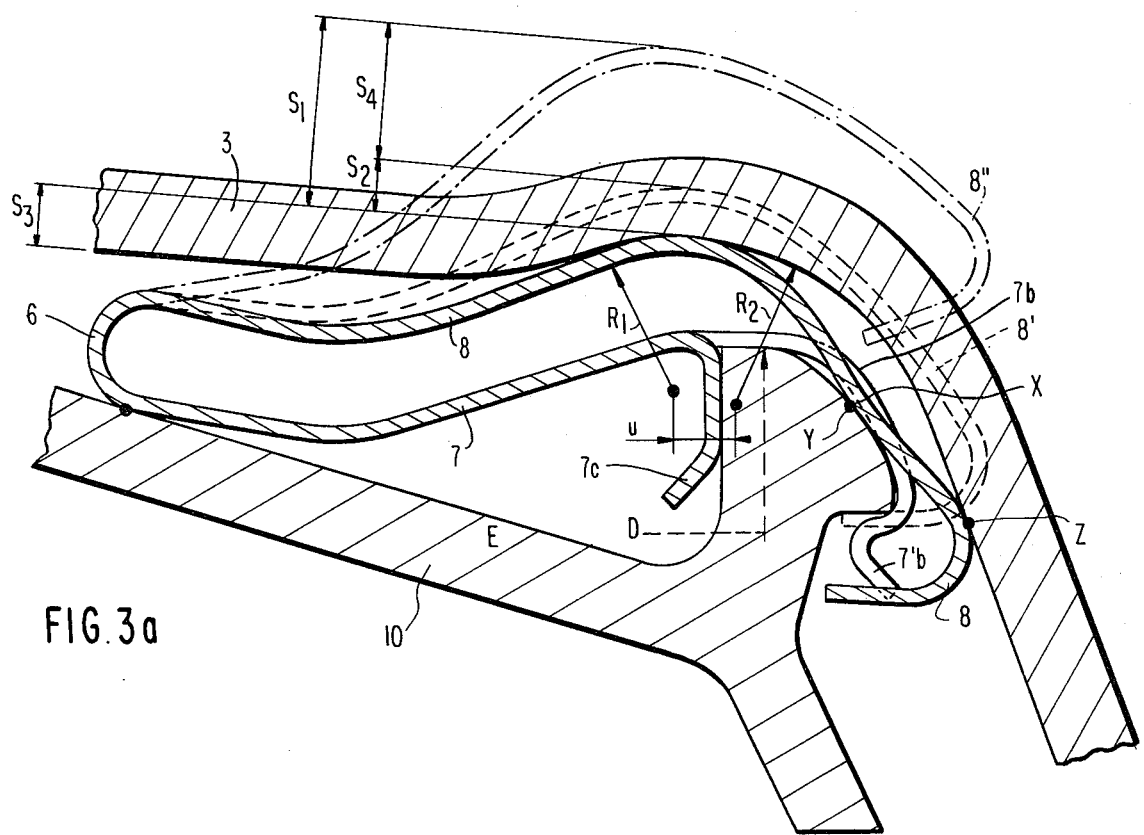
FIG. 3a is an enlarged cross-sectional detailed view of the retaining spring illustrating the spring displacement of a movable leg of the retaining spring.

Referring now to the drawings wherein like reference numerals are used throughout the various views thereof to designate like parts and, more particularly, to FIG. 1 which illustrates a preferred embodiment, a tire 4 is mounted on a rim 3 of a motor vehicle wheel while a wheel cover 1 is mounted onto the rim 3 by way of a mounting arrangement generally designated by the reference numeral 2.

As shown in FIG. 1, the wheel cover 1 is provided with a crown 5 which, preferably, is a circumferentially continuous crown and which is formed along the inside of the wheel cover 1 and serves for receiving the mounting arrangement 2 which is constructed in the form of several retaining springs to be arranged peripherally along the crown 5. The outwardly facing side of the wheel cover 1 is generally designated by the reference numeral 1a.

The retaining springs 2 of which one is shown in plan view in FIG. 2, consist of a bent-over section 6 and of adjoining legs 7 and 8. The section 6 has a loop-shaped configuration and is directed toward the outside 1a of the wheel cover 1 whereas the legs 7 and 8 extend toward the inside of the wheel cover.

As shown in FIG. 2, the lower leg is provided with three tab-like downwardly bent ends 7a, 7b and 7c, of which the two tabs 7a and 7b are each provided with a rearwardly bent nose-shaped end 7'a and 7'b, respectively. The ends 7'a and 7'b resiliently engage into an undercut section 9 on the crown 5 during the installation of the retaining springs. For this purpose, the crown 5 is constructed thicker within the area of the undercut section 9 than the spacing normally maintained between the tab 7c and the tabs 7a and 7b of the unstressed retaining spring. The tabs 7a and 7b and the tab 7c of the lower leg 7 thus exert a clamping force with respect to the crown 5 of the wheel cover 1, which may also be attained possibly without the nose-shaped ends 7'a and 7'b. In this manner, each retaining spring is securely seated on the crown 5. To facilitate the emplacement of the retaining spring 2 onto the crown 5, the tab 7c may be bent backward at its end as shown in FIG. 1.

After an attachment of a retaining spring 2, the lower leg 7, fixedly arranged with respect to the wheel cover 1, assumes the position shown in full lines in FIG. 1, whereas the upper leg 8, which is initially freely movable, assumes the position designated by the reference numeral 8" and shown in dash and dotted lines in FIG. 1. In this position, the respective retaining spring 2 is unstressed. After the mounting of the retaining springs 2 on the crown 5 of the wheel cover 1, the upper and movable leg 8 of each retaining spring 2 is moved downwardly into a position shown in dash lines in FIG. 1 which is designated by the reference numeral 8'. The leg 8 is bent backward at its end in a direction toward the undercut 9. As can be seen from FIG. 1, the leg 8, prior to a mounting of the wheel cover 1 onto the rim 3, is brought into the position designated by reference numeral 8', in which it is held with its end 8'a against the undercut 9. As a result thereof, the retaining springs 2 are prestressed.

During a mounting of the wheel cover or hubcap 1 onto the rim 3, the upper leg 8 is moved into a position shown in solid lines in FIG. 1, that is, its end is forced radially inwardly away from the undercut 9, with respect to the position 8'a, downwardly into the position 8a. The two tabs 7a and 7b of the lower leg 7 maintain a mutual distance which is larger than the width of the end 8a of the leg 8 so that the end 8a of the upper leg 8 remains movable relatively to the tabs 7a, 7b.

The relationship between the assembly and disassembly force, on the one hand, and the retaining force as well as the prestress force, on the other, will be explained by reference to FIGS. 3a and 3b. As shown in FIG. 3a, the spring displacements of the upper leg 8 are indicated in the unstressed condition by the reference numeral 8" and in the operative condition by the reference numeral 8. The spring displacement between the unstressed condition and the operative condition of the leg 8 is designated by the reference character $S_1$. The reference character $S_4$ illustrates the spring displacement between the unstressed and the prestressed conditions of the leg 8, whereas the reference character $S_2$ corresponds to a spring displacement between the pretensioned condition and the operative condition. The value corresponding to the distance $S_3$ determines the difference between the assembly or disassembly force and the retaining force during a respective attachment and removal of the wheel cover 1 to and from the associated rim 3.

As shown in FIGS. 3a and 3b, due to the selected pretensioning force which is attained once the leg 8 assumes the position indicated by the reference numeral 8', the spring displacement during a respective assembly and disassembly of the wheel cover 1 is substantially smaller than the total spring displacement which would have been necessary for attaining the retaining force in the final position of the leg 8. The prestressing force to which the leg 8 of the retaining springs of the mounting arrangement 2 is to be subjected prior to a mounting, is so selected that manufacturing tolerances of the wheel cover 1, of the retaining springs, as well as of the rims 3 are compensated for or equalized and nonetheless an almost uniform retaining force is exerted by the retaining springs 2 on the rim 3. Springs of a lower spring rate or constant are preferably employed as retaining springs 2 in order to keep as small as possible the influence of tolerances on the retaining forces of the wheel cover 1 in the rim 3. Moreover, the retaining springs are prestressed in order to ensure an easy mounting coupled with high disassembly forces.

In accordance with a further embodiment of the present invention, described hereinafter with respect to FIGS. 1 and 3a, the diameter of the mounting or retaining ring 10 of the wheel cover 1 is selected so large that each retaining spring 2 abuts during assembly with the point X of the leg 8 at a point Y of the crown 5 of the retaining ring 1000. Such a choice of the diameter of the crown 5 of the retaining or mounting ring 10 permits a strongly progressive rise of the spring characteristics in accordance with FIG. 3b when the point Z, representing the retaining force, is exceeded, since the free bending length of the leg 8 is shortened. In this case, very high disassembly forces are necessary to remove the wheel cover 1 from the rim 3, whereas the wheel cover 1 in the mounted condition is not subjected to very high forces which are exerted by the retaining springs 2 on the wheel cover 1. Such a construction of the wheel cover 1 with associated mounting is especially suitable for wheel covers 1 made of a synthetic resinous material in order to prevent plastic deformation of the wheel cover 1 due to high forces exerted by the retaining springs. As shown in FIG. 1, the ring section representing the base of the wheel cover 1 carries the crown 5.

Figure 4:
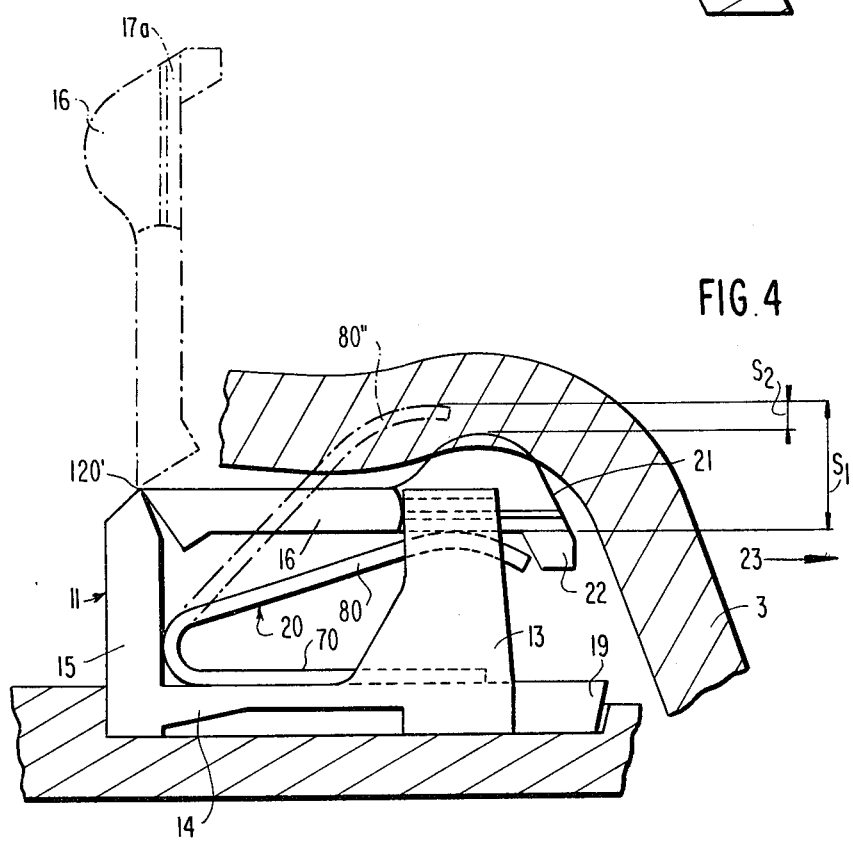
FIG. 4 is a side view of a modified embodiment of a retaining device for a wheel cover in accordance with the present invention.

FIGS. 4 and 5 illustrate a further embodiment of a wheel cover in accordance with the present invention. In this embodiment, the retaining springs generally designated by reference numeral 20 are inserted into a retaining device generally designated by reference numeral 11 which includes a member, preferably made of synthetic resinous material provided with two lateral legs 12 and 13. The two lateral legs 12 and 13 are formed on a base section 14 which is provided at its end face with a connecting member 15 that preferably projects vertically upwardly. The connecting member 15 carries a retaining projection 16 which is movable in the plane of the drawing of FIG. 4 and includes lateral detent cams 17a and 17b (FIG. 5) adapted to engage with associated detent cams 12a and 13a of the legs 12 and 13. The retaining device is inserted into a guide rail 18. For mounting the retaining devices 11, the wheel cover 1 includes several guide rails 18, distributed over the circumference of the wheel cover 1, as can be seen from FIG. 6. The guide rail 18 may preferably have the form of a dove-tail-shaped guidance as shown in FIG. 7 and includes in its center a spring-like detent member 19. so that each retaining device 11, after an insertion into the guide rail 18, is fixed in position by the detent member 19 engaging at a transverse web of the base section 14 of the retaining device 11.

The retaining projection 16 may be constructed in one piece with the connecting member 15 whereby the retaining projection 16 is provided flexible with respect to the base section 14 in order to permit movement into the position shown in full lines in FIG. 4. The retaining projection 16 may also be connected to the connecting member 15 by way of an integrally molded or film-hinge 120 (FIG. 4).

One of the legs 70 of each retaining spring 20 is fixedly arranged at the base section 14. In the unstressed condition, each retaining spring 20 assumes with its movable leg 80 the position 80" shown in dash and dotted lines in FIG. 4. From this unstressed condition, the leg 80 is brought by the retaining projection 16 into the position of the leg 80 shown in full lines in that the retaining projection 16 is forced in the direction toward the legs 12 and 13, as shown in FIG. 4, and more particularly so far until the retaining projection 16 reaches with its detent cams 17a and 17b underneath the detent cams 12a and 13a of the two legs 12 and 13.

In the full line position of the leg 80, respectively, of the retaining projection 16, the leg 80 of the respective retaining spring 2 is prestressed. A movement of the leg 80 in an upward direction (FIG. 4) is prevented by an engagement between the cams 17a and 17b of the retaining projection 16 and the detent cams 12a and 13a of the two legs 12 and 13. After the installation of the wheel cover 1, the retaining projection 16 is moved slightly downwardly as compared to the position shown in full lines in FIG. 4.

The mode of operation of the wheel cover 1 with the mounting device and retaining springs 20 as described in connection with FIGS. 4–6 is thus basically the same as described in connection with the embodiment of FIGS. 1–3 so that the required spring displacement during assembly, respectively, disassembly of the wheel cover 1 is considerably reduced as a result of the prestressing of the retaining springs and permits an easy mounting of the wheel cover 1 coupled with a large disassembly force. Additionally, as with the embodiment of FIGS. 1–3, the construction of FIGS. 4–6 compensates for manufacturing tolerances.

In order to further facilitate a mounting of the wheel cover 1 in the embodiment of FIGS. 4–6, the inwardly directed surface of the retaining projection 16 may be provided with a bevelled surface 21 (FIG. 4). As a result thereof, an insertion of the wheel cover 1 into the rim 3 is facilitated, whereby the surface 21 of each retaining projection 16 comes into engagement with the rim edge.

As shown in FIG. 4, the retaining projection 16 is located on the inside of the wheel cover 1 and, in the operative position (FIG. 5), that is, with an installed wheel cover 1, lies between the two legs 12 and 13 maintaining a spacing therebetween.

Preferably, the retaining projection 16 is provided with an extension 22 which projects downwardly in the direction toward the rim 3. The extension 22 adjoins outwardly the arcuate free end of the upper leg 80. With such a construction of the retaining projections 16 and of the retaining springs 20, the retaining springs may be loosely inserted into the retaining device 11 and are supported within the device 11 by the prestress corresponding to a position of the retaining projection 16 shown in full lines in FIG. 4 and are retained by the extension 22 against movement in a direction of the arrow 23 in FIG. 4. As noted above, the leg 70 may also be fixedly inserted into the retaining device 11, for example, the leg 70 may be placed into an opening provided for this purpose between the legs 12 and 13.

While we have shown and described several embodiments in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A wheel cover which includes a mounting means for enabling mounting of the wheel cover onto a rim of a wheel, the mounting means including a plurality of U-shaped retaining springs each including a bent-over section and two legs adjoining the bent-over section, each of said retaining springs being adapted to resiliently engage into a channel-like identation provided in the rim of the wheel, characterized in that each of the retaining springs has an unstressed condition and a prestressed condition and is constructed so as to enable a predetermined prestressing thereof by movement of at least one leg of each retaining spring over a predetermined prestressing distance, the movable leg of each retaining spring also being movable from the prestressed condition into an installed condition, one point of the movable leg of the retaining spring being operable to abut at a point of the wheel cover during displacement of the movable leg into the installed condition in such a manner that the effective free bending length thereof is shortened and therewith the spring rate of the retaining spring is increased.

2. A wheel cover according to claim 1, characterized in that each of the retaining springs is adapted to be mounted so that the bent-over section is disposed beneath a shoulder of the rim of the wheel and the two legs of each of the retaining springs extend toward an inside of the wheel cover facing a base of the rim.

3. A wheel cover according to claim 2, characterized in that the other of said two legs is immovable, and in that an at least partially continuous crown is provided on the wheel cover for enabling an attachment of the immovable leg to the wheel cover.

4. A wheel cover according to claim 3, characterized in that means are provided for limiting the displacement of the movable leg of the retaining spring.

5. A wheel cover according to claim 4, characterized in that the limiting means is formed by a bent-back end of the movable leg, and in that the bent-back end is engageable behind the crown.

6. A wheel cover according to claim 5, characterized in that the immovable leg is provided with bent tabs adapted to be seated on the crown of the wheel cover.

7. A wheel cover according to claim 6, characterized in that the crown is provided with an undercut section on an inwardly facing side thereof, and in that at least a portion of the bent tabs are provided with detent parts at free ends thereof.

8. A wheel cover according to claim 7, characterized in that two of the bent tabs are disposed symmetrically to a center line of the retaining spring, and are mutually spaced from each other with the movable leg being accommodated in the space between the two tabs.

9. A wheel cover according to one of claims 2, 3, 4, or 5, characterized in that the bent-over section of each of the retaining springs includes a portion adapted to contact a portion of the wheel cover.

10. A wheel cover according to claim 1, characterized in that at least a portion of each of the retaining springs is adapted to contact a base of a well of the rim of the wheel so as to fix the wheel cover in the axial direction of the wheel.

11. A wheel cover according to claim 1, characterized in that each of said retaining springs is capable of providing a force component which acts on the wheel cover in a direction of the base of the well of the rim of the wheel.

12. A wheel cover according to claim 2, characterized in that means are provided for limiting the displacement of the movable leg of the respective retaining springs.

13. A wheel cover which includes mounting means to enable mounting of the wheel cover onto a rim of a wheel, the mounting means including a plurality of U-shaped retaining spring each including a bent-over section and two legs adjoining the bent-over section, each of the retaining springs being constructed so as to enable a predetermined pretensioning thereof, retaining means for each of the retaining spring, means for securely mounting each retaining means on the wheel cover including guide means on the wheel cover, the retaining means including a movable retaining projection and further means enabling the retaining projection to be displaceable into contact with the movable leg of the retaining spring whereby the wheel cover can be installed onto a wheel rim by engagement of the retaining projection in a channel-like indentation provided in the respective wheel rim.

14. A wheel cover according to claim 13, characterized in that said last-mentioned means includes a film-hinge.

15. A wheel cover according to claim 13, characterized in that the retaining means further includes two mutually spaced apart legs, each of said legs being provided with detent cams directed toward each other, and in that the retaining projection is provided with lateral detent cams adapted to engage with the detent cams of the legs of the retaining springs.

16. A wheel cover according to claim 15, characterized in that the retaining projection has a bevelled surface to facilitate mounting of the wheel cover onto the rim of the wheel.

17. A wheel cover comprising mounting means for mounting the wheel cover onto a wheel rim including a plurality of U-shaped retaining springs each having a bent-over section and two legs adjoining the bent-over section, characterized in that each retaining spring has an unstressed condition, a prestressed condition and an installed condition, at least one leg of each retaining spring being movable over a predetermined distance to enable pretensioning by pivoting action about said bent-over section, the movable leg being also freely movable in the generally radial direction during displacement thereof between its prestressed condition and installed condition, and further means requiring a higher force to disassemble the wheel cover from the rim than the force provided for retaining the wheel on the rim in the installed condition, said further means being operable to shorten the effective bending length of said movable leg by engagement thereof with a point-like area of the wheel cover to provide an increased spring rate.

18. A wheel cover according to one of claims 17, characterized in that a retaining means is provided for accommodating each of the retaining springs, and in that means are provided for fixedly attaching each retaining means to the wheel cover.

19. A wheel cover according to claim 18, characterized in that said means for fixedly attaching includes a guide means provided on the wheel cover.

20. A wheel cover according to claim 17, wherein said increase in spring rate is progressive.

* * * * *